United States Patent
Henderson et al.

(10) Patent No.: US 11,817,927 B1
(45) Date of Patent: Nov. 14, 2023

(54) ALLOCATING ANTENNA RESOURCES TO PREPARE FOR IDLE EQUIPMENT TO TRANSITION TO ACTIVE MODE

(71) Applicants: AT&T INTELLECTUAL PROPERTY I, L.P., Atlanta, GA (US); AT&T INTELLECTUAL PROPERTY II, L.P., Atlanta, GA (US); AT&T TECHNICAL SERVICES COMPANY, INC., Vienna, VA (US); AT&T Mobility II LLC, Atlanta, GA (US)

(72) Inventors: Thomas Henderson, Alpharetta, GA (US); Kurt Huber, Ashburn, VA (US); Daniel Vivanco, Ashburn, VA (US); Julius Fodje, Alpharetta, GA (US)

(73) Assignees: AT&T INTELLECTUAL PROPERTY I, L.P., Atlanta, GA (US); AT&T INTELLECTUAL PROPERTY II, L.P., Atlanta, GA (US); AT&T TECHNICAL SERVICES COMPANY, INC., Vienna, VA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 17/829,192

(22) Filed: May 31, 2022

(51) Int. Cl.
*H04B 7/06* (2006.01)
*H04W 52/02* (2009.01)
(Continued)

(52) U.S. Cl.
CPC .......... *H04B 7/061* (2013.01); *H04B 7/0617* (2013.01); *H04W 52/0216* (2013.01); *H04W 64/006* (2013.01); *H04W 72/046* (2013.01)

(58) Field of Classification Search
CPC . H04B 7/061; H04B 7/0617; H04W 52/0216; H04W 64/006; H04W 72/046
See application file for complete search history.

(56) References Cited

U.S. PATENT DOCUMENTS

| 11,356,159 B1 * | 6/2022 | Raghavan | ............ H04B 7/0874 |
| 2015/0236760 A1 * | 8/2015 | Sun | ........................ H04B 7/024 375/267 |

(Continued)

FOREIGN PATENT DOCUMENTS

| CA | 3123390 A1 * | 12/2021 | ........ H04W 72/1268 |
| WO | WO-2008093952 A2 * | 8/2008 | ............ H04B 7/0602 |
| WO | WO-2011132968 A2 * | 10/2011 | ........... H04L 5/0023 |

*Primary Examiner* — Jean B Corrielus
(74) *Attorney, Agent, or Firm* — Amin, Turocy & Watson, LLP

(57) ABSTRACT

The technologies described herein are generally directed to preparing for a connection with a user equipment while the user equipment is in an idle state in a fifth generation (5G) network or other next generation networks. For example, a method described herein can include facilitating transmitting a signal directed by an antenna of base station equipment. The method can further include, facilitating receiving, from a user equipment, a message, wherein the message comprises feedback information describing receipt of the signal while the user equipment was in an idle mode at a location. Further, the method can comprise, based on the feedback information and the location, generating a model of signal propagation applicable to signals at the location.

20 Claims, 10 Drawing Sheets

(51) Int. Cl.
*H04W 64/00* (2009.01)
*H04W 72/044* (2023.01)

(56) References Cited

U.S. PATENT DOCUMENTS

2017/0311291 A1* 10/2017 Dai ..................... H04W 72/542
2018/0270895 A1* 9/2018 Park ..................... H04W 24/04
2022/0038161 A1* 2/2022 Fan ................... H04W 52/0206

* cited by examiner

500

MOBILITY UPDATE MESSAGE ADDENDUM 510

- FREQUENCY OF SIGNAL ANALYZED 520A
- POWER LEVEL OF SIGNAL ANALYZED 520B
- UE CALCULATED PATHLOSS 520C
- LOCATION OF UE AT SAMPLE COLLECTION 520D
- CURRENT LOCATION 520E
- EFFECTIVE ISOTROPIC RADIATED POWER (EIRP) 520F
- EVOLVED UNIVERSAL TERRESTRIAL RADIO ACCESS NETWORK (E-UTRAN) CELL GLOBAL IDENTIFIER (ECGI) OF CELL 520G
- PHYSICAL CELL IDENTIFIER (PCI) 520H
- CURRENT FREQUENCY OF CARRIER MEASURED 520I
- REFERENCE SIGNAL RECEIVED POWER (RSRP) OF SERVING CELL, BEAM ID 520J
- IDLE CHANNEL MEASUREMENTS FROM THE PHONE 520K

FIG. 5

ALLOCATING ANTENNA RESOURCES TO PREPARE FOR IDLE EQUIPMENT TO TRANSITION TO ACTIVE MODE

TECHNICAL FIELD

The subject application is related to different approaches to handling communication in networked computer systems and, for example, to using information from network equipment in idle and active states to improve connections.

BACKGROUND

As demands for fast, high-quality wide area network connections have increased, wireless providers have implemented many new technologies, each having advantages and drawbacks over traditional approaches. New, shorter wavelength frequency bands can provide dramatically faster broadband connections to mobile devices, but because these bands can be blocked easier and have narrower beams, positioning them to offer service to user devices has been challenging.

In addition, because of high-speed connections, some users have become more demanding in the speeds of different traditional network events. Often the same technologies that offer additional performance in some areas do not provide similar performance gains in other areas, e.g., having a fast, low-latency connection available does not necessarily help in the rapid establishment of an active high-performance connection when a connection is requested by a user device.

BRIEF DESCRIPTION OF THE DRAWINGS

The technology described herein is illustrated by way of example and not limited in the accompanying figures in which like reference numerals indicate similar elements and in which:

FIG. 5 is a diagram of a non-limiting example addendum to administrative messages that can provide additional antenna resource allocating information, in accordance with one or more embodiments.

DETAILED DESCRIPTION

Figure 1:
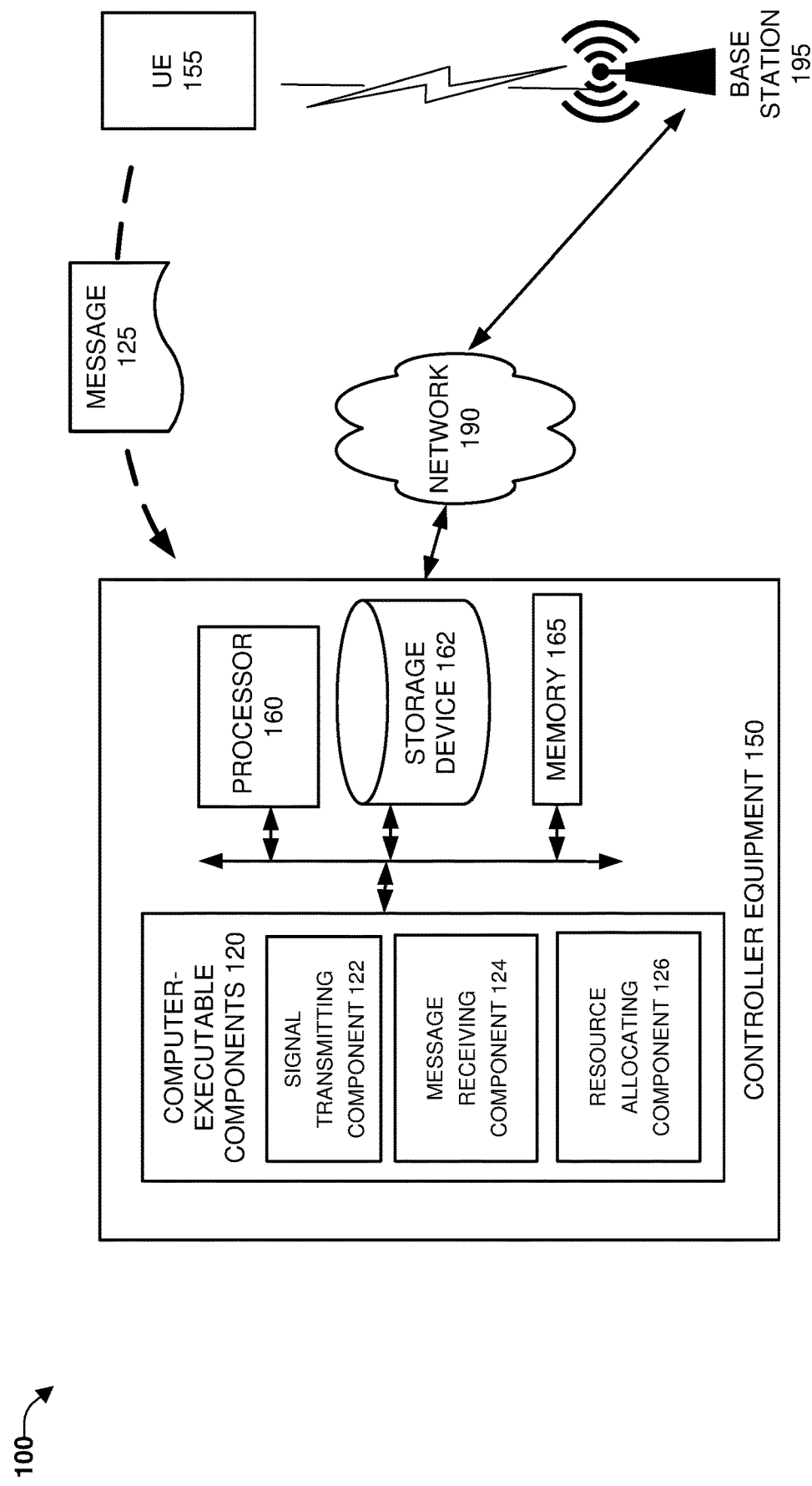
FIG. 1 is an architecture diagram of an example system that can facilitate preparing for a connection with a user equipment while the user equipment is in an idle state, in accordance with one or more embodiments.

Generally speaking, one or more embodiments can facilitate preparing for a connection with a user equipment while the user equipment is in an idle state. In addition, one or more embodiments described herein can be directed towards a multi-connectivity framework that supports the operation of new radio (NR, sometimes referred to as 5G). As will be understood, one or more embodiments can support control and mobility functionality on cellular links (e.g., long term evolution (LTE) or NR). One or more embodiments can provide benefits including, system robustness, reduced overhead, and global resource management.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz long term evolution (LTE) bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting terms "signal propagation equipment" or simply "propagation equipment," "radio network node" or simply "network node," "radio network device," "network device," and access elements can be used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems. The embodiments are however applicable to any radio access technology (RAT) or multi-RAT system where the UEs operate using multiple carriers, e.g., LTE. Some embodiments are described in particular for 5G new radio systems. The embodiments are however applicable to any RAT or multi-RAT system where the UEs operate using multiple carriers, e.g., LTE.

The computer processing systems, computer-implemented methods, apparatus and/or computer program products described herein employ hardware and/or software to solve problems that are highly technical in nature (e.g., estimating location of a UE from signal propagation information and allocating antenna resources), that are not abstract and cannot be performed as a set of mental acts by a human. For example, a human, or even a plurality of humans, cannot efficiently predict a location of a user equipment and rapidly direct multiple signals thereto (which generally cannot be performed manually by a human), with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate preparing for a connection with a user equipment while the user equipment is in an idle state. Different examples that describe these aspects are included with the description of FIGS. 1-10 below. It should be noted that the subject disclosure may be embodied in many different forms and should not be construed as limited to this example or other examples set forth herein.

As is understood by one having skill in the relevant art(s), given the description herein, lack of beam-steering at idle mode can cause UE attach failures and delays, e.g., when the current network footprint does not encompass idle user equipment, there can be a delay (or failure) when the idle UE attempts to connect to the network, otherwise termed herein, go from idle mode to active mode, to be activated, to become persistently active, and other similar terms. As described herein, one or more embodiments can periodically collect information (e.g., regarding location and signal propagation/interference) then use preemptive actions to improve the network footprint to cover a selected number of idle UEs, e.g., selected based on priority and available resources. As described below, preemptive (e.g., before a connection is requested for the UE) actions can include the creation and direction of new energy beams and the adjustment of existing energy beams, to change the network footprint to cover the selected idle UEs. Different examples that describe these aspects are included with the description of FIGS. 1-10 below.

Generally speaking, in one or more non-limiting embodiments discussed herein, signal information that can facilitate establishing connections with UEs that wake-up from an idle communications state, can be periodically collected by UEs in an idle state and provided to network administration processes using an added portion on existing message, e.g., a mobility message. As described herein, based at least on the above-noted signal information collected and relayed by a UE during idle mode, embodiments can improve customer experience by reducing the time that passes between the need for an active connection to the network and the establishing the connection. In alternative or additional embodiments, by tracking the location and signal capabilities of UEs in idle mode, embodiments can alter antenna resource allocations (e.g., directing particular beams to idle UEs) to improve the likelihood that resources will be available for a connection.

It should be noted that, although the tracking area update message is frequently used for illustration herein, one having skill in the relevant art(s), given the discussion herein, would appreciate how to use different types of messages can be used for modifications described herein, e.g., to include the administrative information for functions described herein.

FIG. 1 is an architecture diagram of an example system 100 that can facilitate preparing for a connection with a user equipment while the user equipment is in an idle state, in accordance with one or more embodiments. For purposes of brevity, description of like elements and/or processes employed in other embodiments is omitted.

As depicted, system 100 can include controller equipment 150 communicatively coupled via network 190 to base station 195, which is wirelessly connected to UE 155. Based on different conditions discussed herein, UE 155 communicates a message 125 via base station 195 and network 190 to controller equipment 150. In one or more embodiments, controller equipment 150 can include computer executable components 120, processor 160, storage device 162, and memory 165. A discussed further below, computer executable components 120 can include signal transmitting component 122, message receiving component 124, resource allocating component 126, and other components described or suggested by different embodiments described herein, that can improve the operation of system 100.

Further to the above, it should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, el 150 can further comprise various computer and/or computing-based elements described herein with reference to mobile handset 900 of FIG. 9, and operating environment 1000 of FIG. 10. For example, one or more of the different functions of network equipment can be divided among various equipment, including, but not limited to, including equipment at a central node global control located on the core Network, e.g., mobile edge computing (MEC), self-organized networks (SON), or RAN intelligent controller (RIC) network equipment.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

In one or more embodiments, computer executable components 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining signal transmitting component 122. As discussed with FIGS. 4-5 below, signal transmitting component 122 can, in accordance with one or more embodiments, facilitate transmitting a signal directed by an antenna of base station equipment. For example, in one or more embodiments, facilitating transmitting a signal directed by an antenna of base station equipment.

Further, in another example, in one or more embodiments, computer executable components 120 can include instructions that, when executed by processor 160, can facilitate performance of operations defining message receiving component 124. As discussed with FIGS. 3-4 below, message receiving component 124 can, in accordance with one or more embodiments, facilitate receiving, from a user equipment, a message, wherein the message comprises feedback information describing receipt of the signal while the user equipment was in an idle mode at a location. For example, one or more embodiments can facilitate receiving, from a user equipment, a message, wherein the message comprises feedback information describing receipt of the signal while the user equipment was in an idle mode at a location.

In yet another example, computer executable components 120 can include instructions that, when executed by processor 160, can facilitate performance of operations defining resource allocating component 126. As discussed herein, resource allocating component 126 can, based on the feedback information and the location, generate a model of signal propagation applicable to signals at the location. For example, in one or more embodiments, based on the feedback information and the location, a model of signal propagation applicable to signals at the location can be generated.

In a non-limiting example, functions of controller equipment 150 can be implemented at a distributed or central node global control located on the network, e.g., a mobile edge computing (MEC) of a self-organized network (SON), or a RAN Intelligent Controller (RIC).

Figure 2:
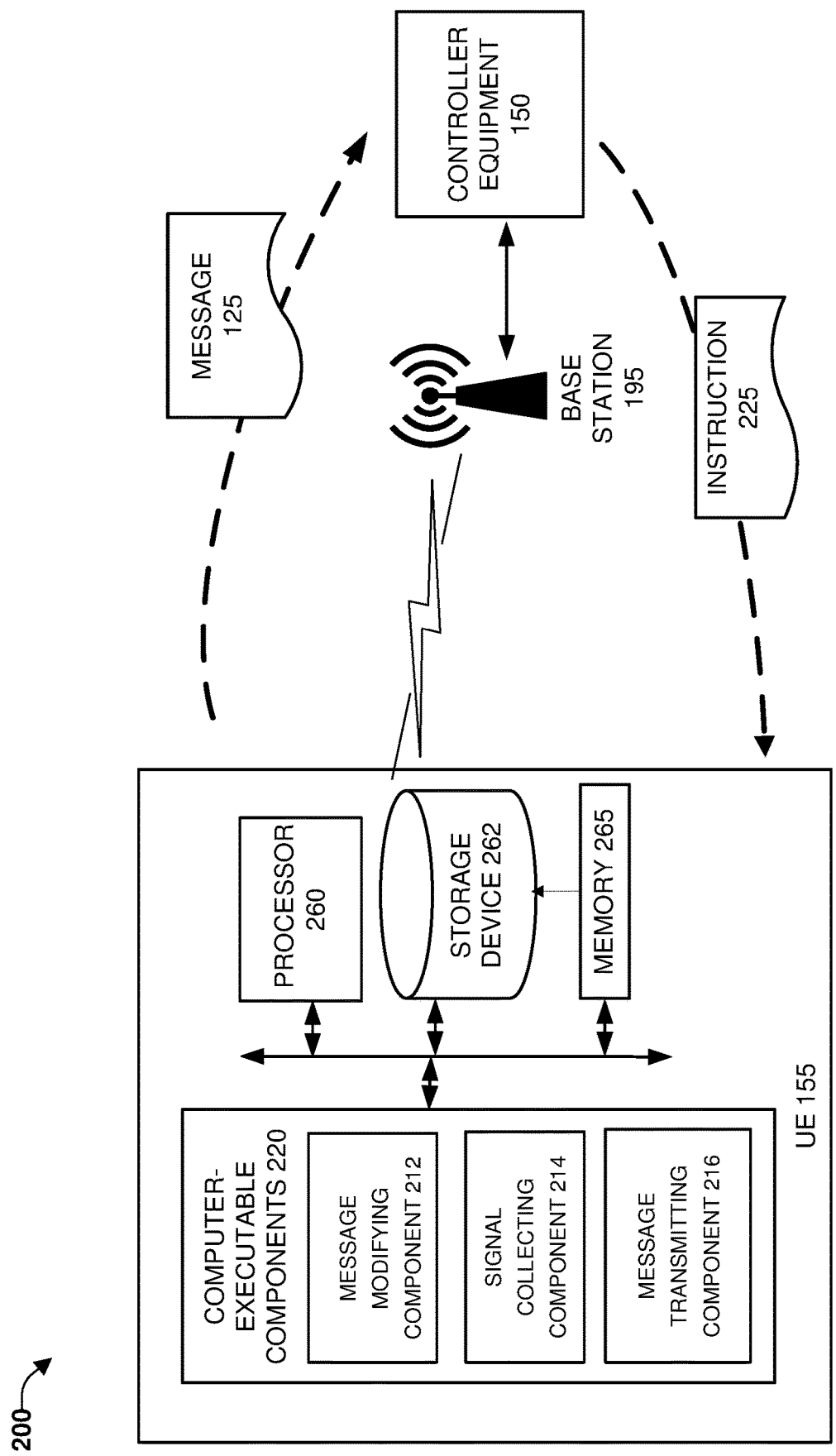
FIG. 2 is a diagram of a non-limiting example system that can facilitate preparing for a connection with a user equipment while the user equipment is in an idle state, in accordance with one or more embodiments.

FIG. 2 is a diagram of a non-limiting example system 200 that can facilitate preparing for a connection with a user equipment while the user equipment is in an idle state, in accordance with one or more embodiments. For purposes of brevity, description of like elements and/or processes employed in other embodiments is omitted.

As depicted, system 200 can include controller equipment 150 communicatively coupled to UE 155 via base station 195 through network 190. Based on different conditions discussed herein, UE 155 communicates a message 125 via base station 195 and network 190 to controller equipment 150. As discussed further below, to facilitate message 125 being a modified version of an existing type of message, controller equipment 150 can send instruction 225 to UE to implement many of the messaging functions described herein. In one or more embodiments, UE 155 can include computer executable components 220, processor 260, storage device 262, and memory 265.

In system 200, computer executable components 220 can include message modifying component 212, signal collecting component 214, message transmitting component 216, and other components described or suggested by different embodiments described herein that can improve the operation of system 200. For example, in some embodiments, UE 155 can further comprise various computer and/or computing-based elements described herein with reference to mobile handset 900 of FIG. 9 and operating environment 1000 described with FIG. 10.

For example, in one or more embodiments, computer executable components 220 can be used in connection with implementing one or more of the systems, devices, components, and/or computer-implemented operations shown and described in connection with FIG. 2 or other figures disclosed herein. For example, in one or more embodiments, computer executable components 220 can include instructions that, when executed by processor 260, can facilitate performance of operations defining message modifying component 212. As discussed with FIGS. 4-5 below, in one or more embodiments, message modifying component 212 can receive an instruction message to integrate an additional section into a location update message.

One approach that can be used by one or more embodiments, is to generate a specific message for communicating information, e.g., radio resource messages can be generated by a UE in response to a request from network administration processes for particular information, handover messages can be generated by the UE based on events such as a diminishing signal strength, and mobility messages can be generated by the UE to register a broad change in location from one tracking area to another.

Alternatively, because UEs already communicate different types of information to network administration processes at different times, to reduce the administrative overhead of implementing one or more embodiments, collected signal and location information can be added as a new part of an existing type of message 125. To implement this 'piggyback' approach, UEs can be configured, e.g., by instruction 225 instructing messaging modifying component 212, to modify standard messages to further include additional information useful for one or more embodiments, e.g., UE global positioning system (GPS) location and ambient signal information. For example, in one or more embodiments during the regular generation and sending of an existing network administration message (e.g., a tracking area update message, discussed below), the information generated by one or more embodiments can be added to the existing message, e.g., with the use of existing unused data fields or by repurposing existing data fields, e.g., as shown with the discussion of FIG. 5 below.

An example general type of message that can be used by one or more embodiments described herein is an idle message, e.g., like the tracking area update message, messages that can be generated by the UE during a time when the UE is not actively wirelessly communicating with the network in a call or exchanging mobile data. In one or more embodiments, idle messages can be generated based on a UE actively collecting information even though the UE is in an idle state. In one or more embodiments, for some idle messaging the collected information can be collected stored before being used to generate an idle message.

Generally speaking, tracking area updates are messages sent by a UE to the network that can be used to inform the network when the UE in an idle communication mode moves from one tracking area to another, e.g., often termed mobility messages because they can facilitate an idle UE being located by a paging message, even if it changes tracking areas while idle. In some implementations, a tracking area update message can also be generated and sent by a UE at a particular time interval, with this interval potentially being changed as described below by one or more embodiments. Stated differently, transmission of the tracking area update can be triggered by the expiration of a repeating, predefined timer at the user equipment, with this transmission occurring regardless of the movement of the user equipment.

It is appreciated by one having skill in the relevant art(s) that when a UE 155 in idle mode detects that is has moved from one tracking area to another, the UE can subsequently transmit the tracking area update message by briefly transitioning out of the idle state of communications to receive the signals that can indicate the tracking area change and to communicate the update message to network administration processes. In addition, the idle state of communications can be used by the UE to reduce power consumption from communications processes but does not mean that the UE is not performing processing operations.

For these tracking area update examples, it should be noted that, in many circumstances, a tracking area can refer to a collection of radio cells that can vary in size based on terrain and reception characteristics. Because of this, a tracking area can vary in size up to being hundreds of square kilometers, e.g., a tracking area update does not generally provide a granular indication of the location of a UE, as can be provided by global navigation satellite systems (GNSS). Thus, while tracking area update messages can be described as facilitating a tracking of location by controller equipment 150 within a broad area, this tracking is generally not sufficient to allocate antenna resources for the types of functions (e.g., accelerated connections to mode transitioning UEs) described with some embodiments herein.

In addition to modifying an existing messaging procedure by adding (potentially unrelated) information to message 125, one or more embodiments can alter procedures by which the existing messages are sent. For example, as noted above, messages can be sent based on different events, e.g., based on a request, based on a change in signal strength, based on a change to a different tracking area, or at particular intervals. For one or more embodiments, to facilitate achieving the goals of the newly generated and sent information, the triggering events for sending the tracking area update message can be changed.

With respect to the message triggering events, it should be noted that one or more embodiments can beneficially alter the conditions to facilitate use of the appended information, while preserving the original function of the altered message 125. For example, because the tracking area update message is triggered to be sent at a particular interval, in one or more embodiments, this interval can be reduced, e.g., to establish an increased granularity for the existing messaging because, for example, the signal and GPS location data described herein can be more useful if received more frequently by controller equipment 150. In one or more embodiments, the extra processing and battery overhead for the UE from the increased frequency of sending a tracking area update can be compared to the utility of the extra information provided for network administration.

In another example, in one or more embodiments, computer executable components 220 can include instructions that, when executed by processor 260, can facilitate performance of operations defining, signal collecting component 214. Signal collecting component 214 can, in accordance with one or more embodiments, collect, during an idle state, signal propagation information applicable to a location. Example types of signal and location data that can be collected, along with the uses for which one or more embodiments can apply the collected data, as described with FIGS. 3-4 below. One approach to collecting signal information by UE 155 is by using idle channel measurements from the phone from system information block (SIB) messages as well as master information block (MIB) messages In another example, in one or more embodiments, computer executable components 220 can include instructions that, when executed by processor 260, can facilitate performance of operations defining, message transmitting component 216. In one or more embodiments, message transmitting component 216 can transmit the location update message (e.g., the tracking area update described above) to second network equipment, e.g., controller equipment 150).

Figure 3:
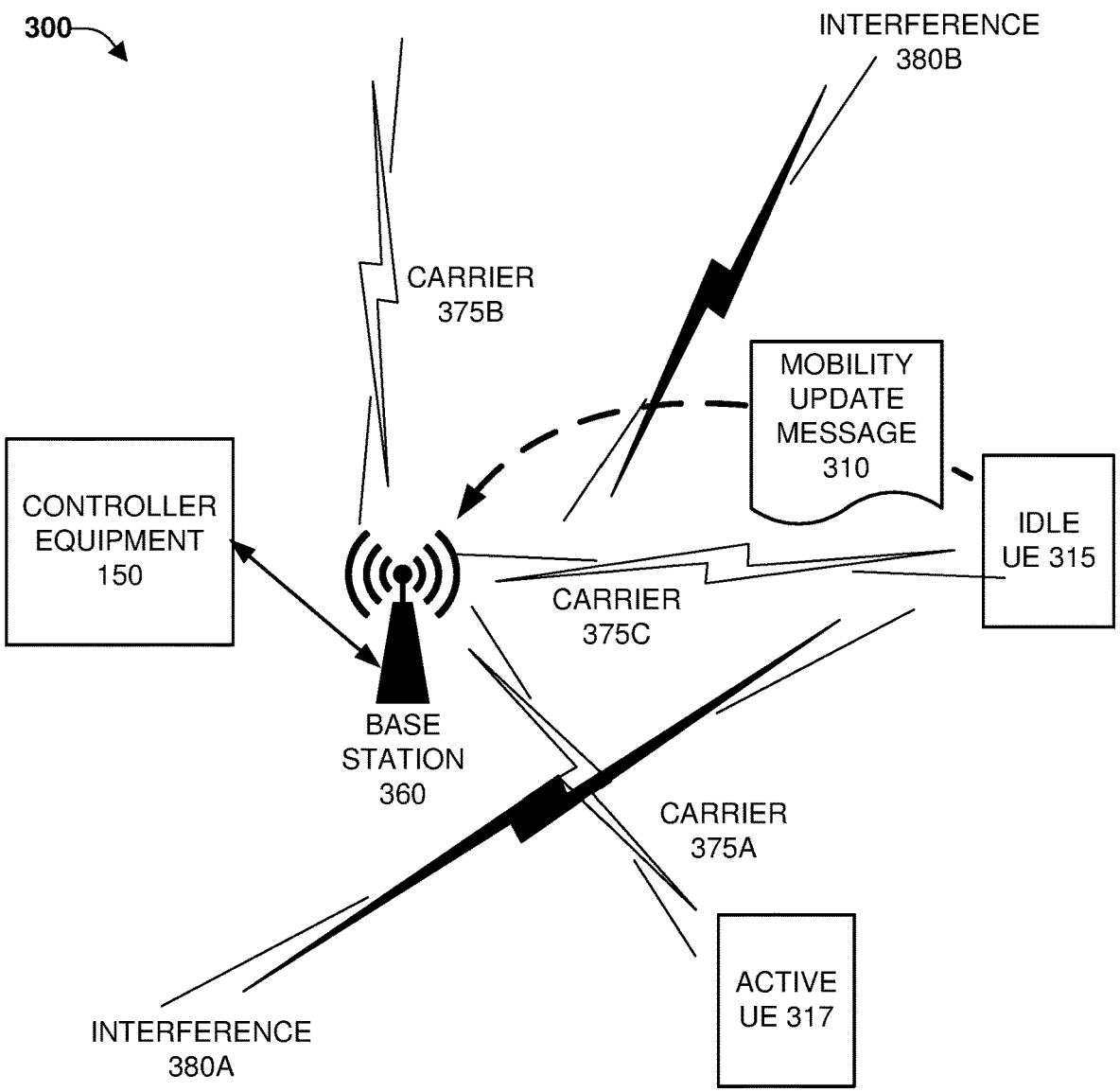
FIG. 3 is a diagram of a non-limiting example system that can facilitate preparing for a connection with a user equipment while the user equipment is in an idle state, in accordance with one or more embodiments.

FIG. 3 is a diagram of a non-limiting example system 300 that can facilitate preparing for a connection with a user equipment while the user equipment is in an idle state, in accordance with one or more embodiments. For purposes of brevity, description of like elements and/or processes employed in other embodiments is omitted. As depicted, system 300 shows controller equipment 150 connected to base station 360, serving idle UE 315 and active UE 317. To facilitate contrasting different approaches to interacting with idle UE 315 described herein to approaches used to interact with active UE 317, carriers 375A-C and interference 380A-B are depicted.

In one or more embodiments, base station 360 can be a fifth or later generation network base station. One having skill in the relevant art(s), given the discussion herein, understands that 5G networks that may use waveforms that split the bandwidth into several sub-bands, with different types of services being accommodated in different sub-bands with complementary waveform and numerology, e.g., leading to improved spectrum utilization for 5G networks. In some implementations, base station 360 can use the mmWave spectrum, with the millimeter waves have shorter wavelengths relative to other communications waves, and thus potentially experiencing higher degrees of path loss, penetration loss, and fading than larger wavelength signals.

In one or more embodiments, the shorter wavelength at mmWave frequencies can also enable more antennas to be located in the same physical dimension, which can enable large-scale spatial multiplexing and highly directional beamforming, e.g., with phased antenna arrays it is possible to create and control the shape and direction of the signal beam from multiple antennas based on the antenna spacing and the phase of signal from each antenna element in the array. In some circumstances, the more radiating elements that make up the antenna, the narrower the beam.

One or more embodiments can use approaches to antenna aiming that utilize dynamically moving antenna elements in different circumstances, as well as approaches where a beam pattern can be dynamically directed by changing the signal phase in real time without changing the antenna elements or other hardware, e.g., beamsteering). For active UE 317, beamforming and beamsteering techniques can be used while active UE 317 remains active and connected, e.g., via carrier 375A. For active UE 317 the base station 360 can track the UE position with reference signals frequently provided to base station 360 to enable necessarily rapid performance of functions including, but not limited to cell selection and reselection, seamless handover from one cell to another, mobility measurements, and estimating propagation values for power control calculations.

In contrast, in one approach to interacting with idle UE 315, because the data bearer for this UE is generally released, base station 360 does not have information regarding the stage or location of idle UE 315. In some circumstances, when UE 315 is requested to transition to an active mode, this approach can cause UE attach failure and/or delay. This negative outcome can occur because of base station 360 already having allocated available antenna resources to carriers 375A-B, with fewer resources being available for a requested carrier 375C. Even if sufficient resources are available to serve transitioning idle UE 315, there can be a delay in connection because base station 360 does not have the carrier 375C energy beam ready and directed toward the user equipment as depicted.

In one or more embodiments, by providing the periodic idle mode messaging regarding the signaling environment and location of idle UE 315 (e.g., mobility update message 310 with appended information), the above-noted delays can be reduced, e.g., by base station 360 reserving resources to handle idle UE 315 as a device with the potential to require a rapid connection. In one or more embodiments, just as carriers 375A-B frequency beams can be steered in different directions to serve active UE 317 and other devices, the direction of carrier 375C can be updated dynamically by base station 360 as idle 360 moves, effectively tracking idle UE 315, albeit at a less frequent interval than active UE 317 in some circumstances based on a conservation of battery power for the idled device.

In another problem depicted in FIG. 3, interference 380A can interfere with active UE 317 using carrier 375A, e.g., multiple neighboring beams can overlap and therefore create inter-cell interference. Based on reference signals provided to base station 360 by active UE 317 however, this interference can be rapidly identified and avoided. In contrast, without different approaches described herein, when idle 315 attempts to transition from idle to a connected mode, interference 380B can prevent idle UE 315 from establishing the connection. Unlike carrier 375A, where interference 380A can be rapidly detected and actively avoided by base station 360, both interference 380B and the resulting problems experienced by transitioning idle UE 315 may be unknown to base station 360.

In a different approach utilized by one or more embodiments described herein, because idle UE 315 can detect and characterize interference 380B, this information can be periodically provided by mobility update message 310 to base station 360. Based on this information, when base station preemptively generates carrier 375C directed to the potentially transitioning idle UE 315, interference 380B can be considered when selecting from available bands. Alternatively, because controller equipment 150 can have information describing multiple base stations in the area, interference 380B can cause a different base station to provide carrier 375C to be ready to accommodate the transition of idle UE 315.

Figure 4:
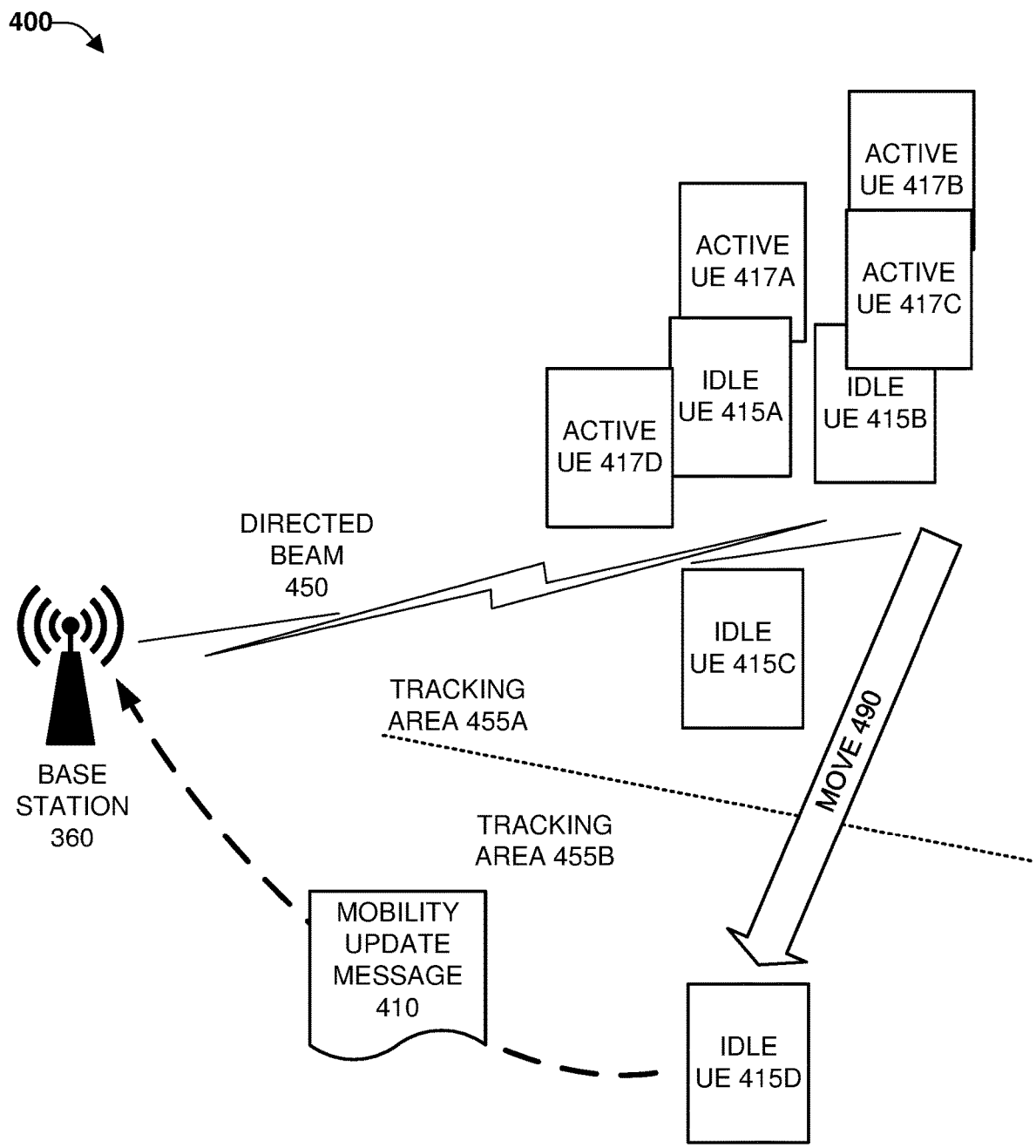
FIG. 4 depicts an example of a system that can facilitate allocating base station antenna resources between active and inactive UEs within a geographic area, in accordance with one or more embodiments.

The examples of FIG. 3 are directed to simple examples where one idle UE 315 is discussed. It should be noted that, while conventional oversubscription of network resources can rely upon a small percentage of all UEs in an area being active at a particular time, this approach to allocating scarce resources generally does not apply as well to the preemptive provision of resources for the potential transition of idle UEs to active UEs, e.g., in some circumstances, a much larger percentage of idle UEs could potentially transition in a given moment than the percentage of active UEs to idle UEs. FIG. 4 describes different approaches that can be used by one or more embodiments to allocate resources to idle UEs within an area.

FIG. 4 depicts an example of a system 400 that can facilitate allocating base station antenna resources between active and inactive UEs within a geographic area, in accordance with one or more embodiments. For purposes of brevity, description of like elements and/or processes employed in other embodiments is omitted. In one or more embodiments, as depicted, system 400 includes base station 360, idle UEs 415A-D and active UEs 417A-D. In an example, base station 360 can provide directed beam 450 to serve the UEs.

In an example, idle UE 415D in tracking area 455A provided a mobility update message (not shown) to controller equipment 150 via base station 360, with action being triggered by idle events described and suggested herein, e.g., the expiration of a time interval. Based on different factors of antenna resource prioritization (e.g., UE priority, UE idle status, other UEs), following an approach described above, using a GPS location from the mobility message, base station 360 can cause directed beam 450 to be directed to provide a rapid connection, should idle UE 415D transition to an active mode.

Continuing this example, idle UE 415D moves 490 to the new location in tracking area 455B (for the purposes of this example, base station 360 serves both tracking areas 455A-B). In terms of how controller equipment 150 handles the receipt of mobility update message 410 in one or more embodiments, different approaches to antenna resource allocation can be considered. As noted above, in some circumstances, a large number of idle UEs could potentially transition in a given moment, and thus idle UEs are considered for the different benefits of directed beam 450 described herein. In one or more embodiments, a number of idle UEs can be dynamically selected and configured based on cell load (e.g., if cell is heavily loaded then embodiments may configure to a lower percentage of UEs to be selected). In additional embodiments, to distribute benefits evenly over time, selection of idle UEs for allocated antenna resources can be random.

Returning to the example, as depicted, idle UE 415D has moved from a congested location to a location without other UEs. Because of this, one or more embodiments can leave directed beam 450 in its depicted location, e.g., potentially facilitating rapid connections for multiple idle UEs 415A-C, all three of which have provided idle location updates to controller equipment 150 and thus can be targeted.

FIG. 5 is a diagram of a non-limiting example addendum to administrative messages that can provide additional antenna resource allocating information, in accordance with one or more embodiments. For purposes of brevity, description of like elements and/or processes employed in other embodiments is omitted.

As depicted, an example mobility update addendum 510 can include, but is not limited to the following characteristics of signals: frequency of signal analyzed 520A, power level of signal analyzed 520B, UE calculated pathloss 520C, location of UE at sample collection 520D, current location 520E, effective isotropic radiated Power (EIRP) 520F, evolved universal terrestrial radio access network (E-UTRAN) cell global identifier (ECGI) of cell 520G, physical cell identifier (PCI) 520H, current frequency of carrier measured 520I, reference signal received power (RSRP) of serving cell, beam ID 520J, and idle channel measurements from the phone 520K.

Figure 6:
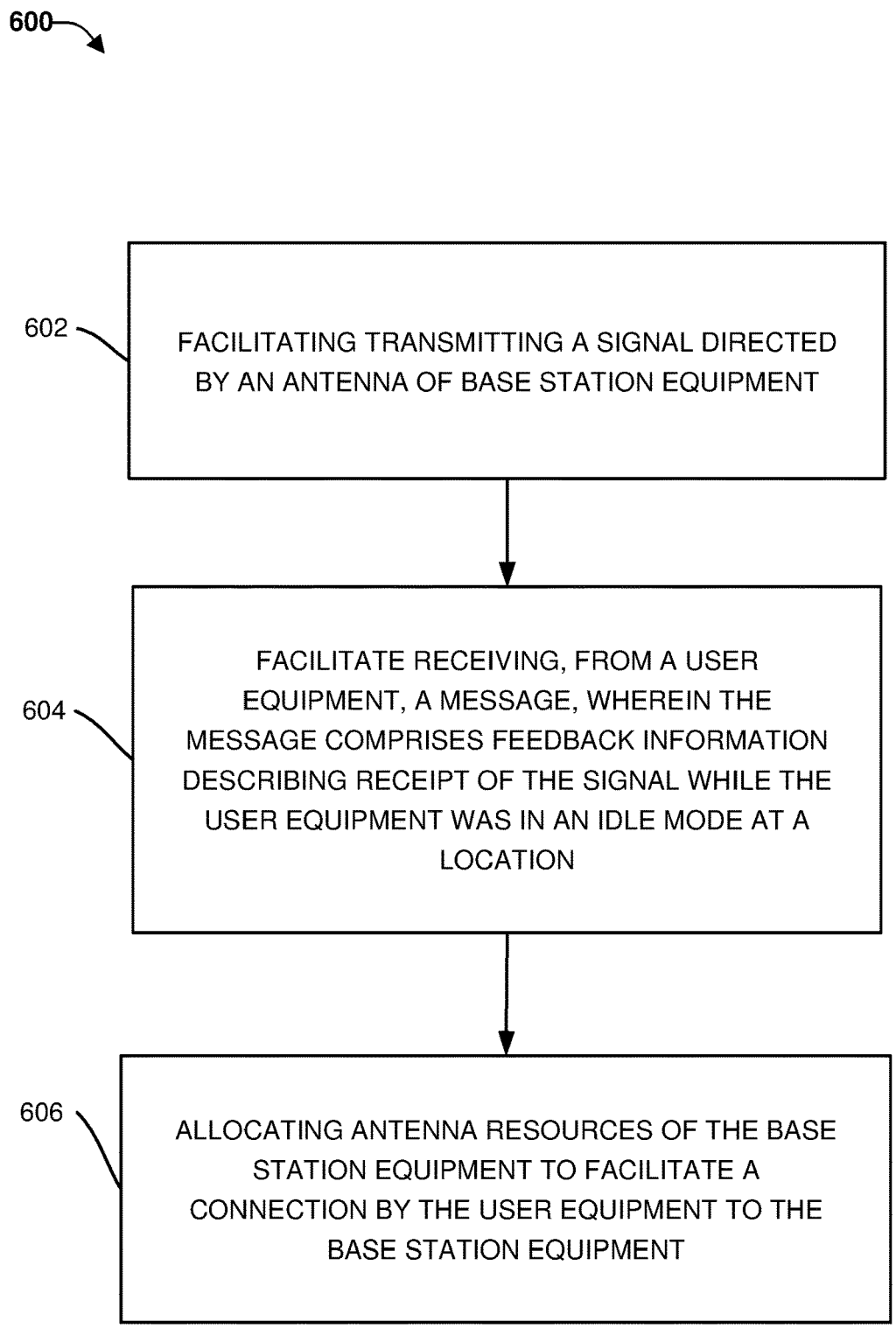
FIG. 6 illustrates an example method 600 that can facilitate preparing for a connection with a user equipment while the user equipment is in an idle state, in accordance with one or more embodiments.

FIG. 6 illustrates an example method 600 that can facilitate preparing for a connection with a user equipment while the user equipment is in an idle state, in accordance with one or more embodiments. For purposes of brevity, description of like elements and/or processes employed in other embodiments is omitted. At 602, method 600 can include facilitating transmitting a signal directed by an antenna of base station equipment. For example, in one or more embodiments, facilitating transmitting by base station 360, directed beam 450.

At 604, method 600 can include, facilitate receiving, from a user equipment, a message, wherein the message comprises feedback information describing receipt of the signal while the user equipment was in an idle mode at a location. For example, in one or more embodiments, facilitate receiving, from a user equipment, mobility update message 410, wherein the message comprises feedback information describing receipt of the signal while the user equipment was in an idle mode at a location. At 606, method 600 can include, based on the feedback information, allocating antenna resources of the base station equipment to facilitate a connection by the user equipment to the base station equipment. For example, based on the feedback information, one or more embodiments can allocate directed beam 450 of base station 360 to facilitate a connection by the idle UE 415D to the base station 360.

Figure 7:
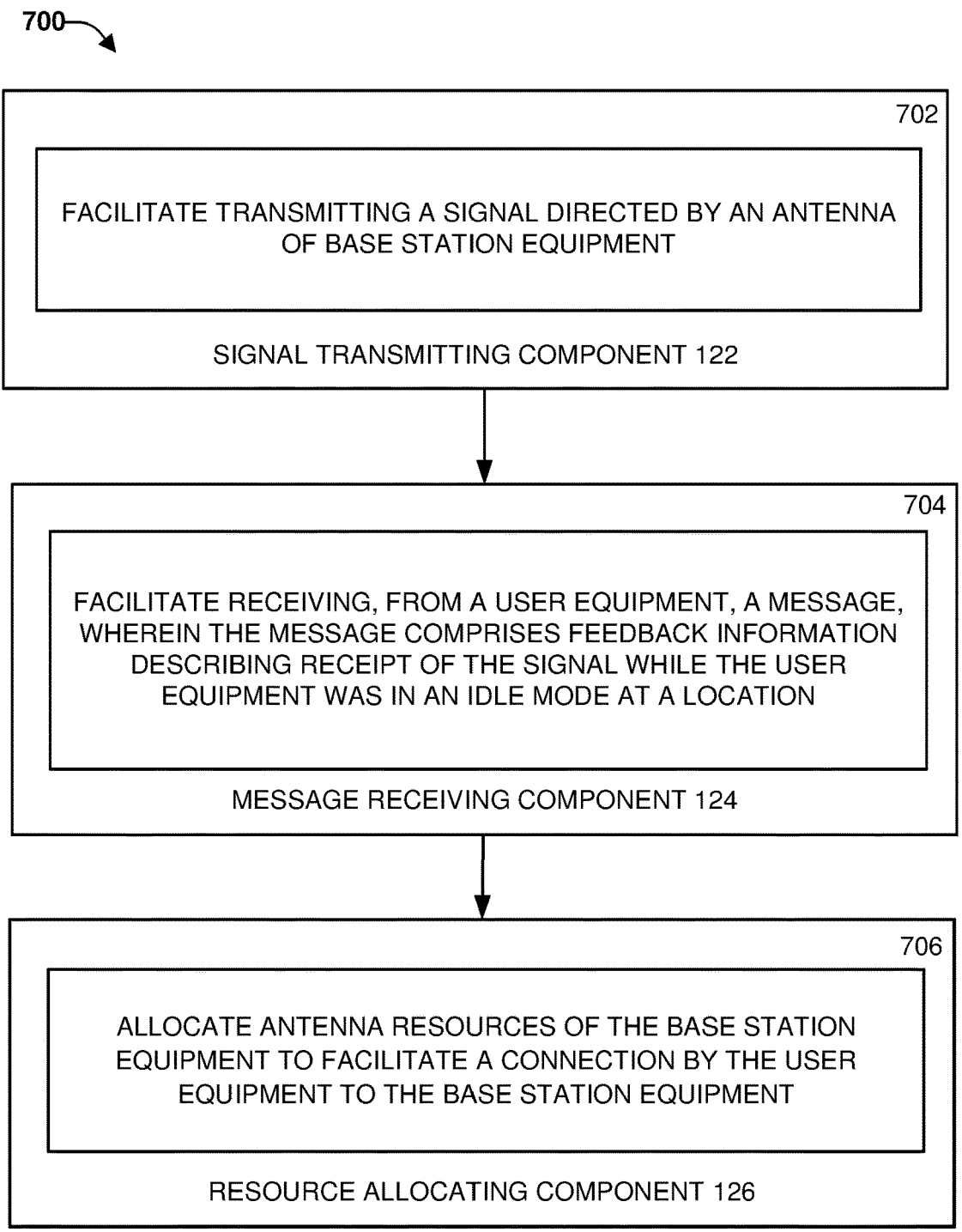
FIG. 7 depicts a system that can facilitate preparing for a connection with a user equipment while the user equipment is in an idle state, in accordance with one or more embodiments.

FIG. 7 depicts a system 700 that can facilitate preparing for a connection with a user equipment while the user equipment is in an idle state, in accordance with one or more embodiments. For purposes of brevity, description of like elements and/or processes employed in other embodiments is omitted. As depicted, system 700 can include signal transmitting component 122, message receiving component 124, resource allocating component 126, and other components described or suggested by different embodiments described herein, that can improve the operation of system 700.

In an example, component 702 can include the functions of signal transmitting component 122, supported by the other layers of system 700. For example, component 702 can facilitate transmitting a signal directed by an antenna of base station equipment. For example, one or more embodiments can facilitate transmitting a signal directed by an antenna of base station equipment. In this and other examples, component 704 can include the functions of message receiving component 124, supported by the other layers of system 700. Continuing this example, in one or more embodiments, component 704 can facilitate receiving, from a user equipment, a message, wherein the message comprises feedback information describing receipt of the signal while the user equipment was in an idle mode at a location. For example, in one or more embodiments, facilitate receiving, from a user equipment, a message, wherein the message comprises feedback information describing receipt of the signal while the user equipment was in an idle mode at a location.

In a further aspect of the example, component 706 can include the functions of resource allocating component 126, supported by the other layers of system 700. For example, component 706 can, based on the feedback information and the location, allocate antenna resources of the base station equipment to facilitate a connection by the user equipment to the base station equipment. For example, in one or more embodiments, resource allocating component 126 of controller equipment 150 can, based on the feedback information and the location, allocate antenna resources of the base station equipment to facilitate a connection by the user equipment to the base station equipment.

Figure 8:
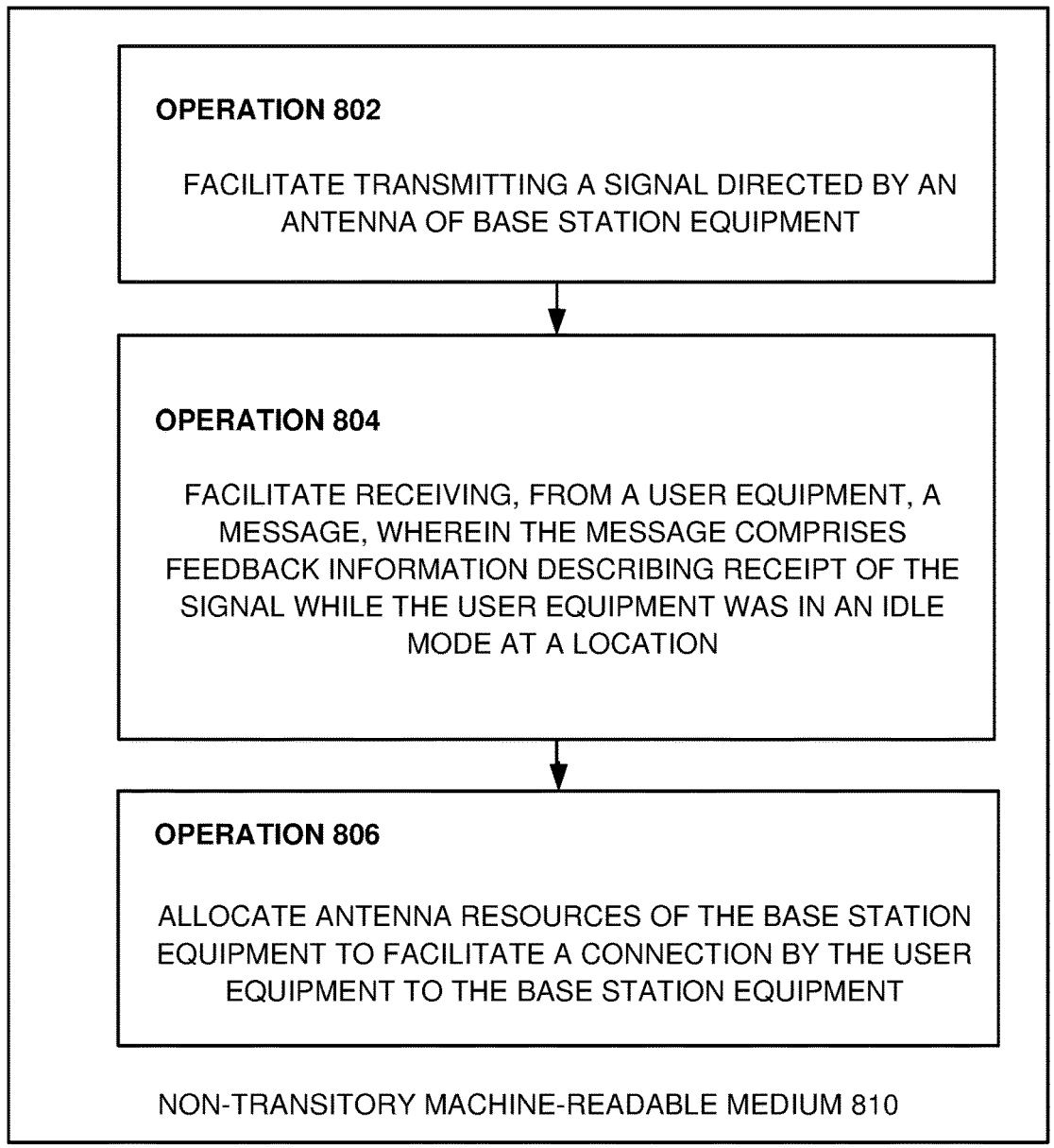
FIG. 8 depicts an example non-transitory machine-readable medium that can include executable instructions that, when executed by a processor of a system, facilitate preparing for a connection with a user equipment while the user equipment is in an idle state, in accordance with one or more embodiments described above.

FIG. 8 depicts an example 800 non-transitory machine-readable medium 810 that can include executable instructions that, when executed by a processor of a system, facilitate preparing for a connection with a user equipment while the user equipment is in an idle state, in accordance with one or more embodiments described above. For purposes of brevity, description of like elements and/or processes employed in other embodiments is omitted. As depicted, non-transitory machine-readable medium 810 includes executable instructions that can facilitate performance of operations 802-806.

In one or more embodiments, the operations can include operation 802 that can facilitate receiving, from a user equipment, a message, wherein the message comprises feedback information describing receipt of the signal while the user equipment was in an idle mode at a location. For example, one or more embodiments can facilitate receiving, from a user equipment, a message, wherein the message comprises feedback information describing receipt of the signal while the user equipment was in an idle mode at a location.

Further, operations can include operation 804, that can facilitate receiving, from a user equipment, a message, wherein the message comprises feedback information describing receipt of the signal while the user equipment was in an idle mode at a location. For example, one or more embodiments can facilitate receiving, from a user equipment, a message, wherein the message comprises feedback information describing receipt of the signal while the user equipment was in an idle mode at a location.

In one or more embodiments, the operations can further include operation 806 that can, based on the feedback information and the location, generate a model of signal propagation applicable to signals at the location. For example, one or more embodiments can, based on the feedback information and the location, allocate antenna resources of the base station equipment to facilitate a connection by the user equipment to the base station equipment.

Figure 9:
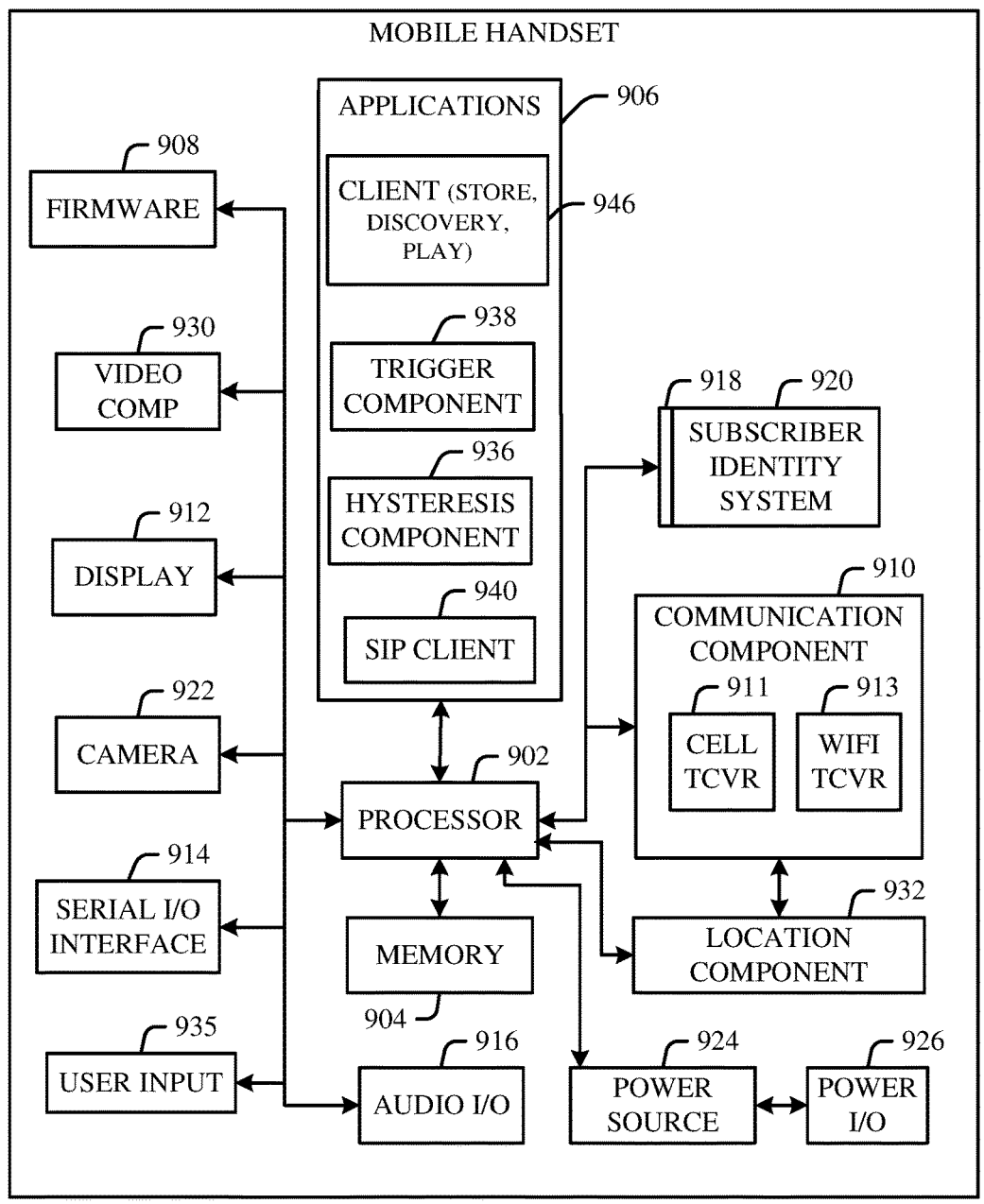
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and can include any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card SIM or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipment operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
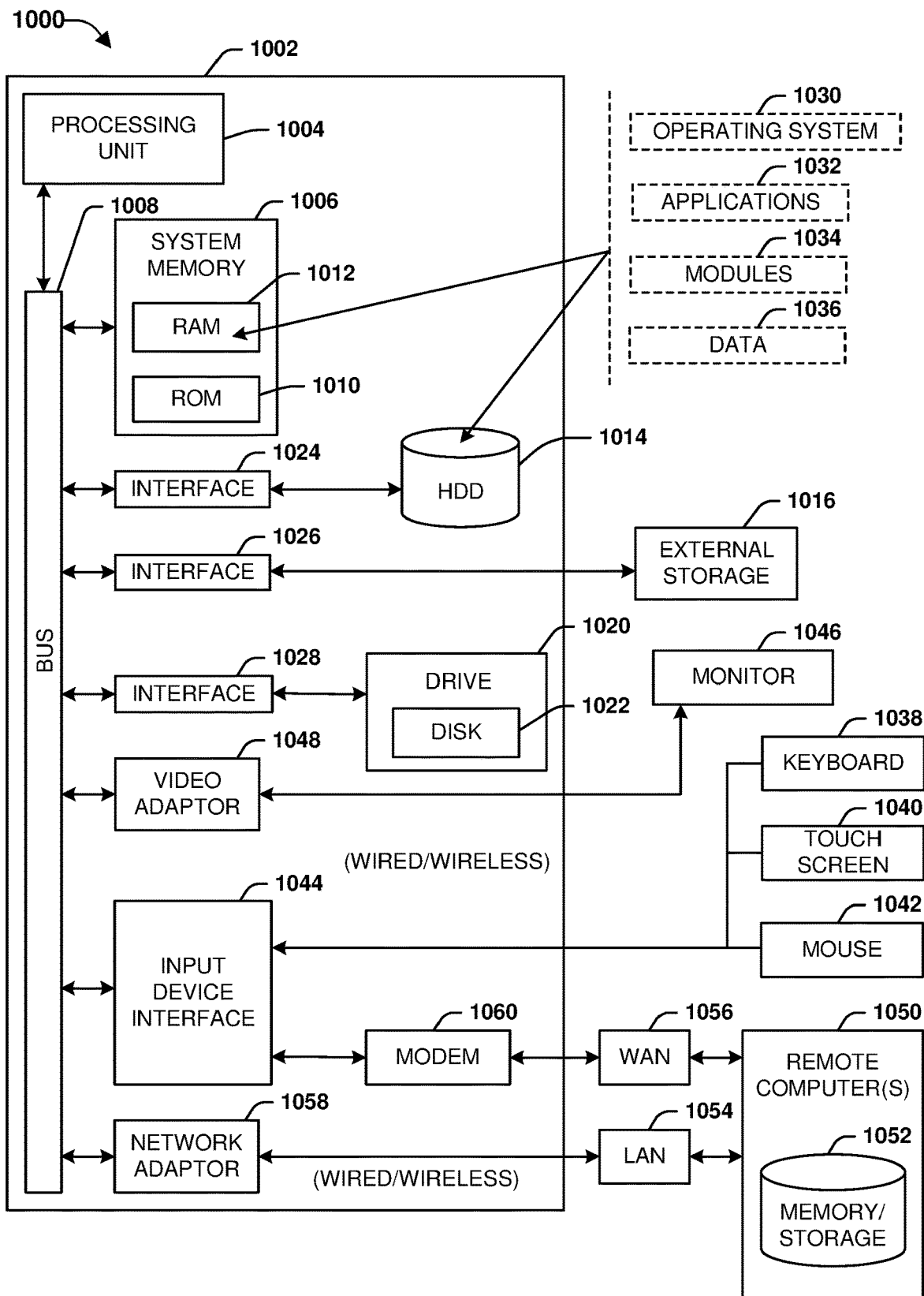
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms can be used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid-state drive, an optical disk drive, which can read or write from a disk 1022, such as a CD-ROM disc, a DVD, a BD, etc. Alternatively, where a solid-state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider, but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like can be used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A method, comprising:
   facilitating, by a system comprising a processor, transmitting a signal directed by antenna resources of base station equipment;
   facilitating, by the system, receiving, from a user equipment, a message, wherein the message comprises feedback information describing receipt of the signal while the user equipment was in an idle mode at a location; and
   based on the feedback information, allocating the antenna resources of the base station equipment to facilitate a connection by the user equipment to the base station equipment.

2. The method of claim 1, wherein receiving the message comprises receiving a mobility management message.

3. The method of claim 2, wherein receiving the mobility management message comprises receiving a tracking area update message from the user equipment.

4. The method of claim 2, wherein receiving the mobility management message comprises receiving the mobility management message with an additional signal propagation portion, and wherein the additional signal propagation portion was appended to the mobility management message by the user equipment.

5. The method of claim 4, wherein the user equipment was selected from a group of user equipment, and wherein the group of user equipment comprises a capability to append the additional signal propagation portion to the mobility management message.

6. The method of claim 2, wherein the location is a first location, and wherein receiving the mobility management message occurs after the user equipment transmitted the mobility management message, triggered to be transmitted based on movement of the user equipment from a first tracking area comprising the first location to a different tracking area comprising a second location different from the first location.

7. The method of claim 2, wherein receiving the mobility management message occurs after the user equipment was triggered to transmit the mobility management message in response to an expiration of a time interval.

8. The method of claim 1, wherein the feedback information further describes the signal interference by other signals detected at the location.

9. The method of claim 8, wherein the connection by the base station equipment to the user equipment is facilitated by reducing the signal interference.

10. The method of claim 1, wherein the antenna resources comprise a beamforming antenna, wherein the signal comprises a beamformed signal directed by the beamforming antenna, and wherein the connection by the base station equipment to the user equipment is facilitated, while the user equipment is in the idle mode, by:
   tracking, by the system, an estimated location of the user equipment, and
   facilitating, by the system, directing the beamformed signal to be in a position to accept the connection when the connection is requested.

11. The method of claim 1, wherein the signal is a first signal, and further comprising, altering, by the system, a parameter of the antenna resources for transmission of a second signal directed by the antenna resources.

12. The method of claim 11, wherein the parameter is altered to change a characteristic of the second signal to facilitate reception of the second signal by the user equipment.

13. The method of claim 12, wherein the reception of the second signal is facilitated by altering the parameter to change a predicted ratio of signal to interference plus noise at a predicted location of the user equipment, and wherein the predicted ratio of signal to interference plus noise at the predicted location was generated based on the feedback information.

14. First network equipment, comprising:
   a processor; and
   a memory that stores executable instructions that, when executed by the processor, facilitate performance of operations, comprising:
      receiving an instruction message to integrate an additional section into a location update message,
      collecting, during an idle state, signal propagation information applicable to a location, and
      transmitting the location update message to second network equipment, wherein the additional section comprises the signal propagation information and the location, and wherein the signal propagation information is usable by the second network equipment to allocate, during the idle state, antenna resources for an active connection to the first network equipment.

15. The first network equipment of claim 14, wherein the location update message comprises a tracking area update message, wherein the additional section comprises additional information stored in free space within the location update message, and wherein the tracking area update message is triggered to be transmitted by the first network equipment to the second network equipment periodically or based on movement of the first network equipment.

16. The first network equipment of claim 15, wherein the operations further comprise communicating with an antenna resource of base station equipment to transition from the idle state to a state of active communications with the second network equipment, and wherein, based on the additional information of the location update message, and before the communicating, a parameter of the antenna resources was adjusted to facilitate transitioning from the idle state to the state of active communications.

17. The first network equipment of claim 16, wherein the antenna resources comprise a beam directional antenna resource, wherein the parameter comprises a directed location of beam coverage of the beam directional antenna resource, wherein the parameter was generated based on a predicted location of the first network equipment, and wherein the predicted location was generated based on the additional information of the location update message.

18. A non-transitory machine-readable medium, comprising executable instructions that, when executed by a processor of a beam controller device, facilitate performance of operations, comprising:
- based on ones of a group of beamformed signals transmitted by antenna resources of a geographic area, receiving signal propagation information from a group of idle user equipment;
- based on the signal propagation information, predicting respective signal reception characteristics of respective ones of the group of idle user equipment; and
- based on the respective signal reception characteristics, allocating the antenna resources of the geographic area to serve the group of idle user equipment.

19. The non-transitory machine-readable medium of claim 18, wherein the signal propagation information was received via extra information appended to respective idle status messages transmitted by selected ones of the group of idle user equipment.

20. The non-transitory machine-readable medium of claim 18, wherein at least some of the antenna resources are allocated to facilitate at least some of the group of idle user equipment transitioning from an idle state to a state of active communications with the antenna resources.

* * * * *